United States Patent
Adema

(10) Patent No.: US 11,585,975 B2
(45) Date of Patent: Feb. 21, 2023

(54) OPTICAL COMBINER LENS WITH REFLECTIVE OPTICAL COATING TO GUIDE LIGHT ACROSS A SEAL

(71) Applicant: Google LLC, Mountain View, CA (US)

(72) Inventor: Daniel Robert Adema, Kitchener (CA)

(73) Assignee: GOOGLE LLC, Mountain View, CA (US)

(*) Notice: Subject to any disclaimer, the term of this patent is extended or adjusted under 35 U.S.C. 154(b) by 543 days.

(21) Appl. No.: 16/713,230

(22) Filed: Dec. 13, 2019

(65) Prior Publication Data

US 2020/0200964 A1  Jun. 25, 2020

Related U.S. Application Data

(60) Provisional application No. 62/782,923, filed on Dec. 20, 2018.

(51) Int. Cl.
*G02B 27/01* (2006.01)
*F21V 8/00* (2006.01)

(52) U.S. Cl.
CPC ......... *G02B 6/0076* (2013.01); *G02B 6/0055* (2013.01); *G02B 27/0172* (2013.01); *G02B 6/003* (2013.01)

(58) Field of Classification Search
None
See application file for complete search history.

(56) References Cited

U.S. PATENT DOCUMENTS

2007/0070859 A1* 3/2007 Hirayama .......... G02B 27/0172
                                                              369/112.04
2014/0340286 A1* 11/2014 Machida .............. G02B 27/017
                                                              345/8

* cited by examiner

*Primary Examiner* — Nicholas J Lee

(57) ABSTRACT

An optical combiner lens includes a lightguide having an input zone at which light enters the lightguide, an output zone from which light exits the lightguide, and a propagation zone between the input zone and the output zone that provides a propagation path for light from the input zone to the output zone. A lens is stacked over the lightguide. A seal engages the lightguide and the lens. The seal is positioned relative to the lightguide such that a portion of the seal is stacked over a portion of the propagation zone. A reflective optical coating is interposed between the portion of the propagation zone and the portion of the seal.

20 Claims, 12 Drawing Sheets

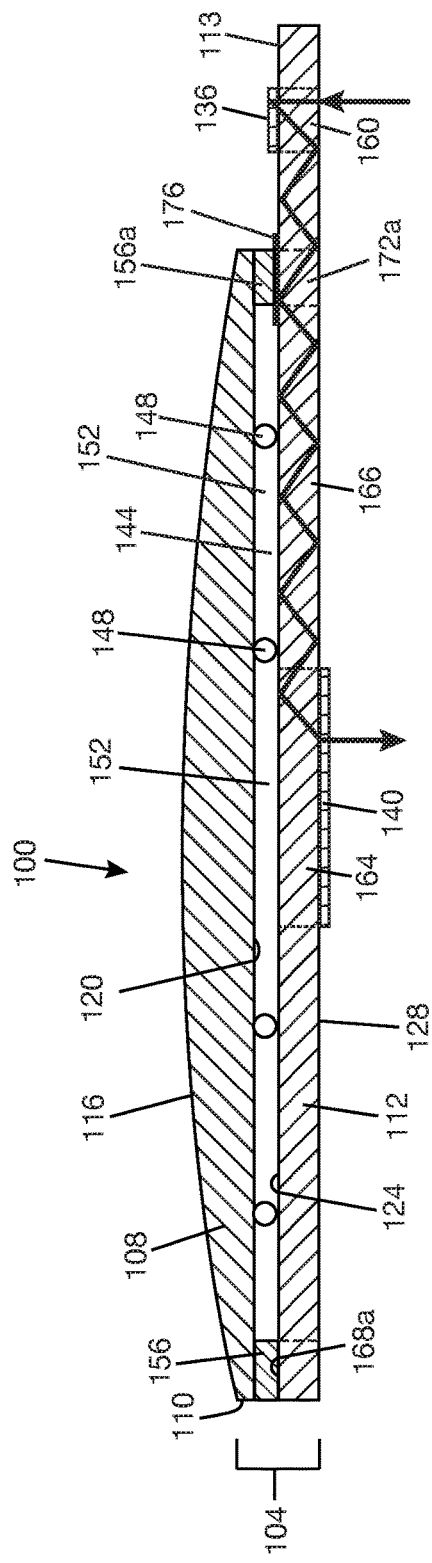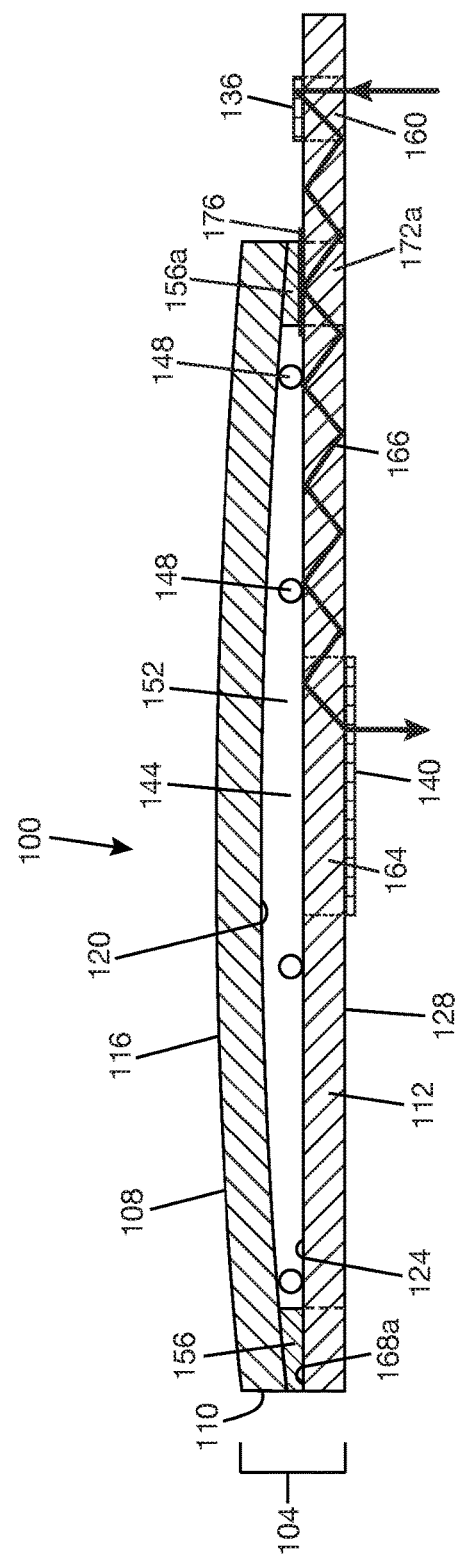
FIG. 1A
FIG. 1B

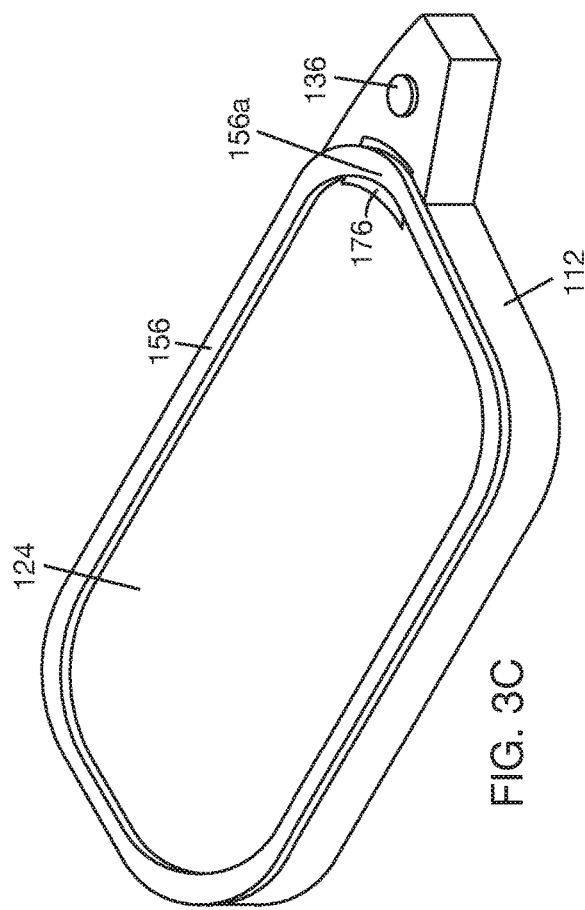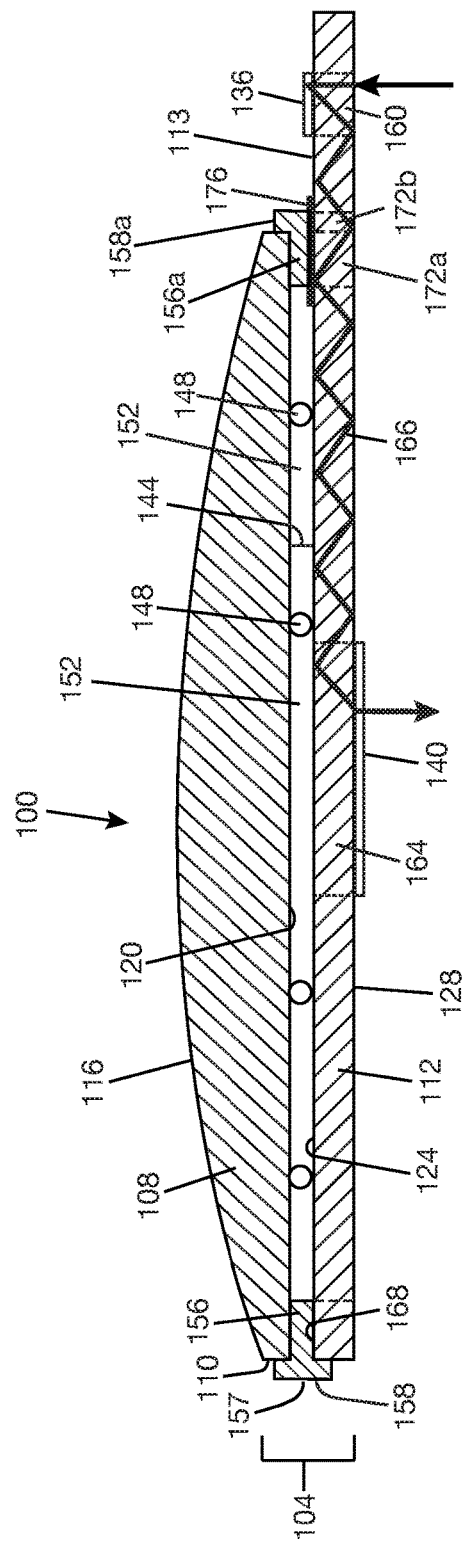

OPTICAL COMBINER LENS WITH REFLECTIVE OPTICAL COATING TO GUIDE LIGHT ACROSS A SEAL

CROSS-REFERENCE TO RELATED APPLICATIONS

This application claims the benefit of U.S. Provisional Application No. 62/782,923, filed 20 Dec. 2018, the disclosure of which is incorporated herein by reference.

TECHNICAL FIELD

The disclosure relates generally to optical combiners and particularly to integration of optical combiners in lenses and use of such optical combiner lenses in wearable heads-up displays.

BACKGROUND

Wearable heads-up displays use optical combiners to combine real world and virtual images. There are two main classes of optical combiners used in wearable heads-up displays: free-space combiners and substrate-guided combiners. Free-space combiners use one or more reflective, refractive, or diffractive optical elements to redirect light from a light source to a target. In substrate-guided combiners, light enters a guide substrate, e.g., a waveguide or lightguide, typically through an in-coupling element, propagates along the length of the guide substrate by total internal reflection, and exits the guide substrate, typically through an out-coupling element. There may be additional optical elements in the guide substrate to redirect light, e.g., reflect, refract, or diffract light, within the guide substrate. Optical combiners may be integrated into lenses that can be fitted into support frames of the wearable heads-up displays. However, it remains challenging to integrate an optical combiner into a lens.

SUMMARY

In a first aspect, an optical combiner lens typically includes a lightguide having an input zone at which light enters the lightguide, an output zone from which light exits the lightguide, and a propagation zone between the input zone and the output zone that provides a propagation path for light from the input zone to the output zone. A lens is stacked over the lightguide, and a seal engages the lightguide and the lens. The seal is positioned relative to the lightguide such that a portion of the seal is stacked over a portion of the propagation zone of the lightguide. A reflective optical coating is interposed between the portion of the seal and the portion of the propagation zone.

In variants, the optical combiner lens according to the first aspect may further include one or more of the features described in A1 to A11 below.

A1: An output coupler may be positioned to couple light out of the output zone of the lightguide. The output coupler may be an optical grating.

A2: The input zone of the lightguide may be provided by a portion of an edge of the lightguide.

A3: An input coupler may be positioned to couple light into the input zone of the lightguide. The input coupler may be an optical grating.

A4: The input zone of the lightguide may be formed in an extension portion of the lightguide that is not in registration with the lens.

A5: The seal may form a sealant layer between the lens and a portion of the lightguide that is in registration with the lens. The sealant layer may form a closed loop.

A6: The seal may form a sealant band around the lens and a portion of the lightguide that is in registration with the lens.

A7: The seal may include a first seal section that forms a sealant layer between the lens and a portion of the lightguide that is in registration with the lens and a second seal section that forms a sealant band around the lens and the portion of the lightguide that is in registration with the lens.

A8: The lens and the lightguide may have opposed surfaces that are spaced apart by a medium gap having a set height. The seal may circumscribe the medium gap. A plurality of spacers may be disposed in the medium gap to maintain the set height. The medium gap may contain a medium in spaces between and around the spacers, where the medium has a refractive index that is lower than a refractive index of the lightguide.

A9: The lightguide may be a planar lightguide.

A10: The lens may be selected from a planoconvex lens and a meniscus lens.

A11: The reflective optical coating may be a metallic coating or a dielectric coating.

In a second aspect, an optical combiner lens typically includes a lightguide, an input coupler, an output coupler, a sealant layer, a lens, and a reflective optical coating. The input coupler is positioned to couple light into the lightguide at an input zone. The output coupler is positioned to couple light out of the lightguide at an output zone, where the output zone is spaced from the input zone by a propagation zone that extends between the input and the output zones. The lens, the sealant layer, and the lightguide are in a stack. The sealant layer is positioned intermediate between the lightguide and the lens, with a portion of the sealant layer positioned to overlie the propagation zone. The reflective optical coating is interposed between the propagation zone and the portion of the sealant layer that is positioned to overlie the propagation zone.

In a third aspect, an optical combiner lens typically includes a lightguide having an input zone at which light enters the lightguide, an output zone from which light exits the lightguide, and a propagation zone between the input zone and the output zone that provides a propagation path for light from the input zone to the output zone. A first lens is stacked over a top surface of the lightguide, and a second lens that is stacked under a bottom surface of the lightguide. A first seal engages the first lens and the lightguide such that a portion of the first seal is positioned to overlie the propagation zone, and a second seal engages the second lens and the lightguide such that a portion of the second seal is positioned to underlie the propagation zone. A first reflective optical coating is interposed between the propagation zone and the portion of the first seal overlying the propagation zone. A second reflective optical coating is interposed between the propagation zone and the portion of the second seal underlying the propagation zone.

In variants, the optical combiner lens according to the third aspect may further include one or more of the features described in B1 to B15 below.

B1: An output coupler may be positioned to couple light out of the output zone of the lightguide.

B2: An input coupler may be positioned to couple light into the input zone of the lightguide.

B3: The input zone of the lightguide may be provided by a portion of an edge surface of the lightguide.

B4: The input zone of the lightguide may be formed in an extension portion of the lightguide that is not in registration with the lens.

B5: The first seal may form a first sealant layer between the first lens and a portion of the lightguide that is in registration with the first lens, where the first sealant layer forms a closed loop.

B6: The second seal may form a second sealant layer between the second lens and a portion of the lightguide that is in registration with the second lens, where the second sealant layer forms a closed loop.

B7: The first seal may form a first sealant band around the first lens and a portion of the lightguide that is in registration with the first lens.

B8: The second seal may form a second sealant band around the second lens and a portion of the lightguide that is in registration with the second lens.

B9: The first sealant band as described in B7 and the second sealant band as described in B8 may be connected to form a single sealant band.

B10: The first lens has a first inner lens surface that is in opposing relation to the top lightguide surface, where the first inner lens surface may be spaced apart from the top lightguide surface by a first medium gap having a first set height. The first seal may circumscribe the first medium gap. A plurality of spacers may be disposed in the first medium gap to maintain the first set height. The first medium gap may contain a first medium in spaces between and around the spacers, where the first medium has a refractive index that is lower than a refractive index of the lightguide.

B11: The second lens has a second inner lens surface that is in opposing relation to the bottom surface of the lightguide, where the second inner lens surface may be spaced apart from the bottom surface of the lightguide by a second medium gap having a second set height. The second seal may circumscribe the second medium gap. A plurality of spacers may be disposed in the second medium gap to maintain the second set height. The second medium gap may contain a second medium in spaces between and around the spacers, where the second medium has a refractive index that is lower than a refractive index of the lightguide.

B12: The lightguide may be a planar lightguide.

B13: The first lens may be selected from a planoconvex lens and a meniscus lens.

B14: The second lens may be selected from a planoconcave lens and a biconcave lens.

B15: The first and second reflective optical coatings may be metallic coatings or dielectric coatings.

In a fourth aspect, an optical combiner lens typically includes a stack of lightguides, where each of the lightguide in the stack of lightguides has an input zone at which light enters the lightguide, an output zone from which light exits the lightguide, and a propagation zone between the input zone and the output zone across which light propagates from the input zone to the output zone. A first lens is stacked over a first lightguide at a top of the stack of lightguides, and a second lens is stacked under a second lightguide at a bottom of the stack of lightguides. A first seal engages the first lens and the first lightguide, where a portion of the first seal is positioned to overlie the propagation zone of the first lightguide. A first reflective coating is interposed between the propagation zone of the first lightguide and the portion of the first seal overlying the propagation zone of the first lightguide. A second seal engages the second lens and the second lightguide, where a portion of the second seal is positioned to underlie the propagation zone of the second lightguide. A second reflective coating is interposed between the propagation zone of the second lightguide and the portion of the second seal that underlies the propagation zone of the second lightguide.

In variants, the optical combiner lens according to the fourth aspect may further include one or more of the features described in C1 to C3 below.

C1: An output coupler may be provided for each lightguide, where each output coupler is positioned to couple light out of the output zone of the respective lightguide.

C2: An input coupler may be provided for each lightguide, where each input coupler is positioned to couple light out of the output zone of the respective lightguide.

C3: A third seal is positioned intermediate between the first lightguide and the second lightguide, where a portion of the third seal is stacked between the propagation zone of the first lightguide and the propagation zone of the second lightguide. A third reflective optical coating is interposed between the third seal and the propagation zone of the first lightguide. A fourth reflective optical coating is interposed between the third seal and the propagation zone of the second lightguide.

The foregoing general description and the following detailed description are exemplary of the invention and are intended to provide an overview or framework for understanding the nature of the invention as it is claimed. The accompanying drawings are included to provide further understanding of the invention and are incorporated in and constitute part of this specification. The drawings illustrate various embodiments of the invention and together with the description serve to explain the principles and operation of the invention.

BRIEF DESCRIPTION OF DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIG. 1A is a cross-sectional view showing an optical combiner lens including a lens and a lightguide arranged in a stack, spacers disposed between the lens and the lightguide, a seal engaging the lens and the lightguide, a reflective optical coating interposed between a portion of the seal and the lightguide, an input coupler positioned to couple light into the lightguide, and an output coupler positioned to couple light out of the lightguide.

FIG. 1B is a cross-sectional view showing the optical combiner lens of FIG. 1A, where the lens is a meniscus lens.

FIG. 3C is an isometric view showing a sealant layer on a lightguide with a reflective optical coating interposed between the sealant layer and a top surface of the lightguide.

FIG. 4A is a cross-sectional view showing an optical combiner lens including a lens and a lightguide arranged in a stack, a seal having an inner portion forming a sealant layer between the lens and the lightguide and an outer portion forming a sealant band around the lens and the lightguide, and a reflective optical coating interposed between a portion of the seal and the lightguide.

DETAILED DESCRIPTION

Figure 1C:
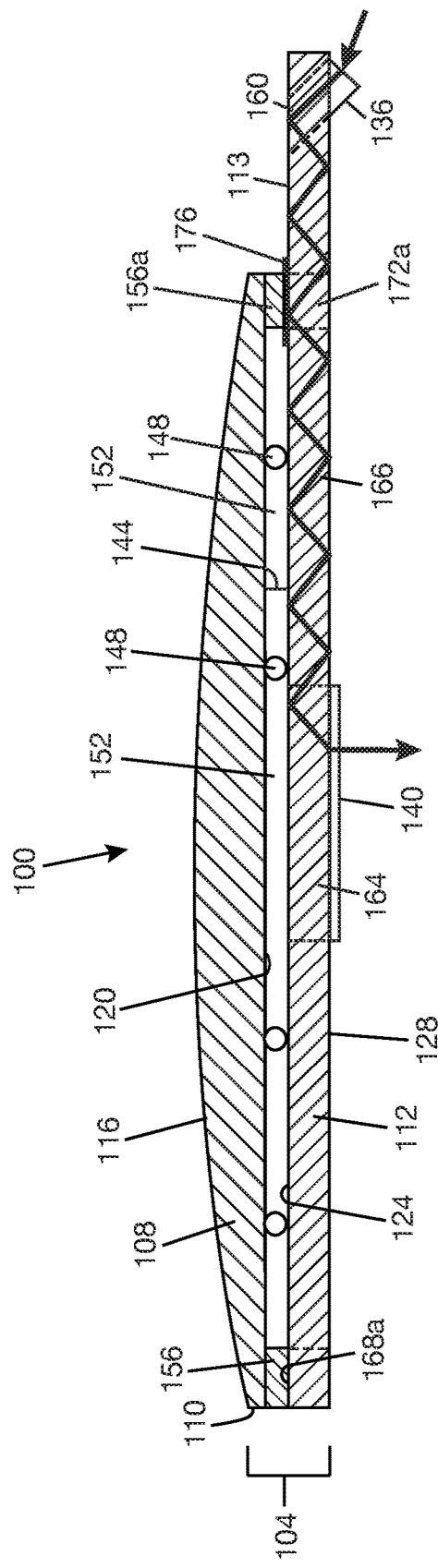
FIG. 1C is a cross-sectional view showing the optical combiner lens of FIG. 1A, where the input coupler is a prism.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices have not been shown or described in detail to avoid unnecessarily obscuring descriptions of the embodiments. For the sake of continuity, and in the interest of conciseness, same or similar reference characters may be used for same or similar objects in multiple figures. For the sake of brevity, the term "corresponding to" may be used to describe correspondence between features of different figures. When a feature in a first figure is described as corresponding to a feature in a second figure, the feature in the first figure is deemed to have the characteristics of the feature in the second figure, and vice versa, unless stated otherwise.

In this disclosure, unless the context requires otherwise, throughout the specification and claims which follow, the word "comprise" and variations thereof, such as, "comprises" and "comprising" are to be construed in an open, inclusive sense, that is as "including, but not limited to."

In this disclosure, reference to "one implementation" or "an implementation" or to "one embodiment" or "an embodiment" means that a particular feature, structures, or characteristics may be combined in any suitable manner in one or more implementations or one or more embodiments.

In this disclosure, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the disclosure provided herein are for convenience only and do not interpret the scope or meaning of the embodiments or implementations.

FIG. 1A shows an optical combiner lens 100 according to one illustrative implementation. Optical combiner lens 100 includes a lens 108 and a lightguide 112 arranged to form a stack 104. Lens 108 has an outer lens surface 116 and an inner lens surface 120, which are separated by at least one layer of lens material. Any suitable lens material, such as plastic, e.g., polycarbonate, or glass, may be used as the lens material. Preferably, the lens material is transparent to at least some optical wavelengths of electromagnetic energy, e.g., wavelengths corresponding to the colors red through violet. In the illustrated example of FIG. 1A, lens 108 is a planoconvex lens, where outer lens surface 116 is a convex surface and inner lens surface 120 is (substantially) flat or planar. In other examples, lens 108 may be a different type of lens, such as a meniscus lens as shown in FIG. 1B, where outer lens surface 116 is a convex surface and inner lens surface 120 is a concave surface. Returning to FIG. 1A, outer lens surface 116 may be the world side of optical combiner lens 100. The curvature of outer lens surface 116 may be selected to achieve a select eyeglasses prescription and/or achieve other combiner lens function, such as displaying an image at a particular distance in front of the combiner lens. If lens 108 is a meniscus lens, as illustrated in FIG. 1B, inner lens surface 120 will provide an additional curvature that can be suitably adjusted. One or more coatings, such as anti-scratch coating, anti-reflective coating, and/or IR-blocking coating may be applied to any of lens surfaces 116, 120.

For lightguide 112, the term "lightguide" as used herein will be understood to mean an optical element using total internal reflection to transfer collimated light. For display applications, the collimated light may be a collimated image, and the lightguide transfers and replicates the collimated image to the eye. Lightguide 112 has a top lightguide surface 124 and a bottom lightguide surface 128. The lightguide surfaces 124, 128 are separated by at least one layer of lightguide material or by a lightguide structure. Bottom lightguide surface 128 may be the eye side of optical combiner lens 100. In one example, lightguide 112 may be a planar lightguide. The term "planar lightguide" may generally cover examples where both lightguide surfaces 124, 128 are (substantially) planar. In other examples, either of lightguide surfaces 124, 128 may be a curved surface (i.e., not lying flat in a plane) or a combination of curved and planar surfaces. In one example, lightguide 112 may be a piece of lightguide material capable of transmitting light coupled into the lightguide. Preferably, the lightguide material is transparent to at least some wavelengths of electromagnetic energy. In some examples, the lightguide material may be a lens material such as described above. However, the materials of lightguide 112 and lens 104 do not have to be the same. Alternatively, lightguide 112 may be a planar waveguide including a core between two claddings, where the core has a higher refractive index compared to the claddings, and the light propagates within the core. One or more coatings, such as anti-scratch coating, anti-reflective coating, and/or IR-blocking coating may be applied to any of lightguide surfaces 124, 128.

In one implementation, optical combiner lens 100 includes an input coupler 136 positioned to couple light into lightguide 112 and an output coupler 140 positioned to couple light out of lightguide 112. In one example, each of input coupler 136 and output coupler 140 may be any type of optical grating structure, including, but not limited to, diffraction gratings, holograms, holographic optical elements (e.g., optical elements using one or more holograms), volume diffraction gratings, volume holograms, surface relief diffraction gratings, and/or surface relief holograms. Each of input coupler 136 and output coupler 140 may be of the transmission type, meaning the coupler transmits light and applies designed optical function(s) to the light during the transmission, or of the reflection type, meaning the coupler reflects light and applies designed optical function (s) to the light during the reflection. A transmission type coupler would be positioned proximate top lightguide surface 124, and a reflection type coupler would be positioned proximate bottom lightguide surface 128. In the examples shown in FIGS. 1A and 1B, input coupler 136 is illustrated as a reflection coupler, while output coupler 140 is illustrated as a transmission coupler. In general, a combination of reflection and transmission couplers, only reflection couplers, or only transmission couplers may be used for the input and output couplers 136, 140. In another example, as illustrated in FIG. 1C, input coupler 136 may be a prism.

Figure 2:
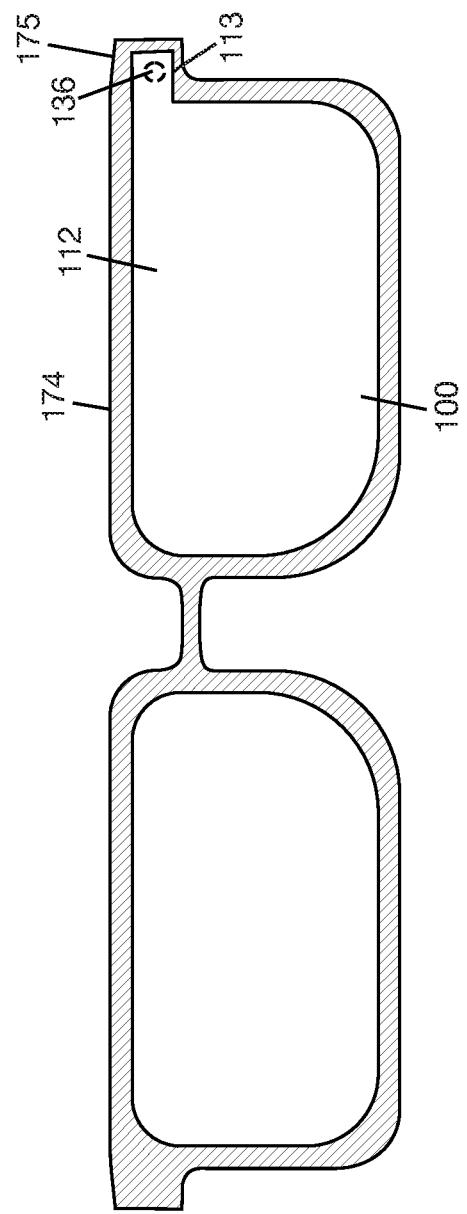
FIG. 2 is a cross-sectional view of a frame front and shows an optical combiner lens mounted in the frame front.

Input and output couplers 136, 140 are optically coupled to lightguide 112. This may include, but is not limited to, any combination of physically attaching couplers 136, 140 to lightguide 112, integrally forming couplers 136, 140 with lightguide 112, and embedding couplers 136, 140 in a respective surface of lightguide 112. In FIGS. 1A-1C, input coupler 136 is optically coupled to an extension portion 113 of lightguide 112 that extends past a periphery of lens 108 (or that is not in registration with or aligned with lens 108). Referring to FIG. 2, when optical combiner lens 100 is mounted in a frame front 174 of a wearable heads-up display, extension portion 113 of lightguide 112 will be tucked away in a widened corner 175 of frame front 174. Widened corner 175 may be where a temple (not shown) would be attached to frame front 174. This may simplify the relay optics to project light to input coupler 136 from a light source inside the temple.

Figure 1D:
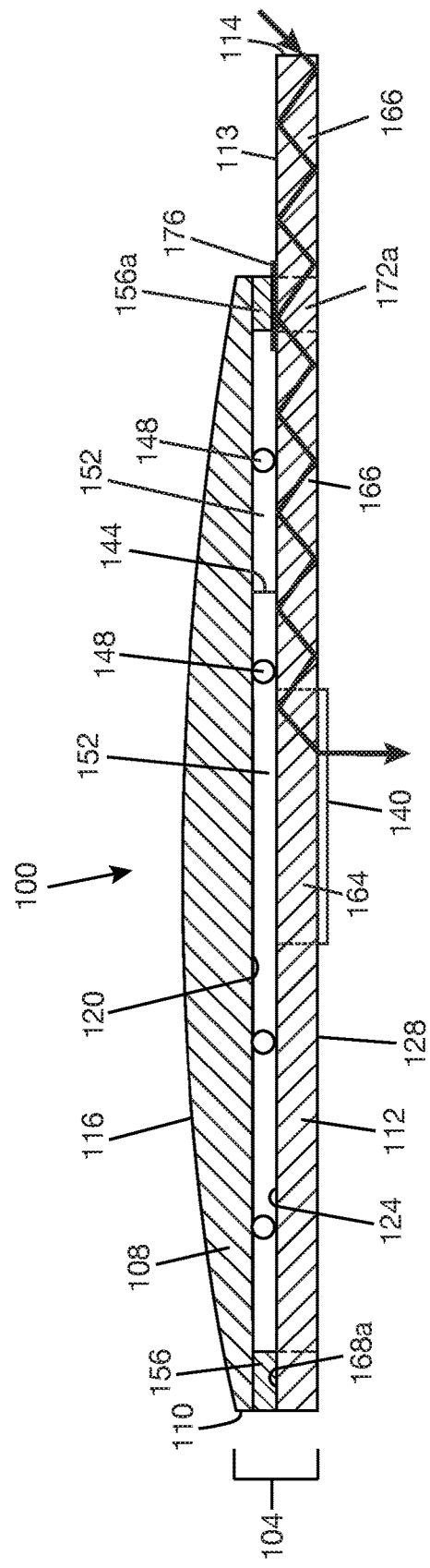
FIG. 1D is a cross-sectional view showing the optical combiner lens of FIG. 1A, where edge coupling is used to couple light into the lightguide.

In another implementation, optical combiner lens 100 may include only output coupler 140, and input coupler 136 may be omitted. FIG. 1D illustrates an example where input coupler 136 is omitted. In this example, light may be coupled into lightguide 112 from an input edge 114 of the lightguide 112. Input edge 114 is a portion of an edge surface of lightguide 112 (the edge surface of lightguide 112 is the surface of lightguide 112 extending between a perimeter of top lightguide surface 124 and a perimeter of bottom lightguide surface 128, as shown at 115 in FIG. 3A). Input edge 114 may be located on extension portion 113 of lightguide 112 (see a possible location of input edge 114 in FIG. 3A). Input edge 114 may be suitably shaped to facilitate edge coupling of light into lightguide 112.

Figure 1E:
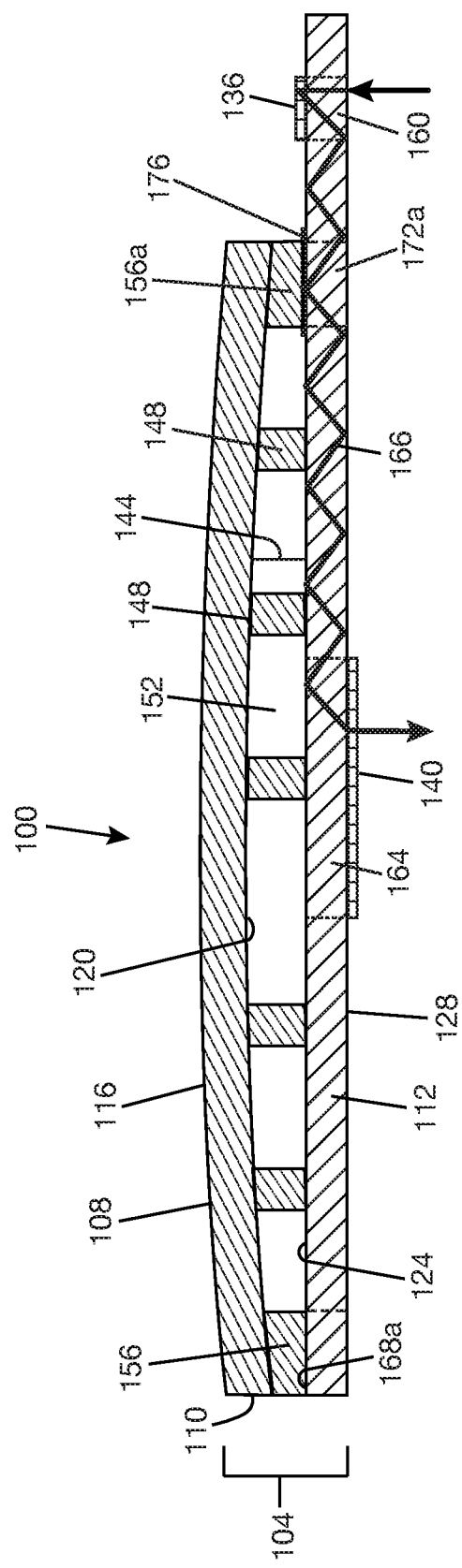
FIG. 1E is a cross-sectional view showing the optical combiner lens of FIG. 1A, where the lens is a meniscus lens and the spacers are micropillars.

Returning to FIG. 1A, in the stacked arrangement of lens 108 and lightguide 112, inner lens surface 120 is in opposing relation to top lightguide surface 124 and is spaced apart from top lightguide surface 124 by a medium gap 144 having a set height. Spacers 148 may be arranged in medium gap 144, between inner lens surface 120 and top lightguide surface 124, to set the height of medium gap 144. Spacers 148 may contact one or both of inner lens surface 120 and top lightguide surface 124. The height of medium gap 144 may be uniform across the stack or may be nonuniform across the stack, e.g., due to localized bending of lens 108 and/or lightguide 112 or due to the inner lens surface 120 and/or top lightguide surface 112 not being perfectly flat or not being parallel to each other. In one example, the set height of medium gap 144 may be in a range from 2 microns to 100 microns. In one example, spacers 148 are round microparticles ("microbeads") made of inorganic material, such as silica or polymer, e.g., poly(methyl metaacrylate) (PMMA). Hemispherical microp articles and other types of spacers besides round microparticles, such as micropillars, may be used. As an example, FIG. 1E shows spacers 148 between lens 108 and lightguide 112 as micropillars. In the illustrated example of FIG. 1E, lens 108 is a meniscus lens. As can be observed in FIG. 1E, spacers 148 may have different heights so that each spacer 148 contacts both inner lens surface 120 and top lightguide surface 124. FIG. 1E may be contrasted to FIG. 1B, where some of the microbead spacers 148 are not tall enough to contact both inner lens surface 120 and top lightguide surface 124.

Returning to FIG. 1A, medium gap 144 contains a medium in spaces 152 around and in between spacers 148. Typically, the medium in spaces 152 is air. In general, the medium could be a gaseous material, such as air or nitrogen, a liquid material, or a solid material. In general, the refractive index of the medium in spaces 152 is substantially different, e.g., less, than the refractive index of lightguide 112, which would allow light fed into lightguide 112 at angles that are equal to or greater than an associated critical angle to propagate within lightguide 112 by total internal reflection.

As illustrated in FIGS. 1A-1E, a seal in the form of a sealant layer 156 is disposed between lens 108 and lightguide 112. The sealant layer 156 holds lens 108 and lightguide 112 together while sealing around medium gap 144. In one example, sealant layer 156 sealingly engages both inner lens surface 120 and top lightguide surface 124. In one example, sealant layer 156 forms a closed loop (see FIG. 5) and is located proximate a periphery 110 of stack 104 so as to circumscribe medium gap 144 and provide medium gap 144 with a hermetic seal proximate periphery 100 of stack 104. Placing sealant layer 156 proximate the periphery 110 of stack 104 also removes sealant layer 156 from the visible portion of optical combiner lens 100 when optical combiner lens 100 is mounted in a frame front (as shown in FIG. 2). In general, sealant layer 156 may be made of one or more non-porous or impermeable materials to provide a hermetic seal. In some examples, sealant layer 156 may be made of a curable material, such as a UV curable resin, or may be a double-sided adhesive pad, or may be other seal material or structure.

Figure 3A:
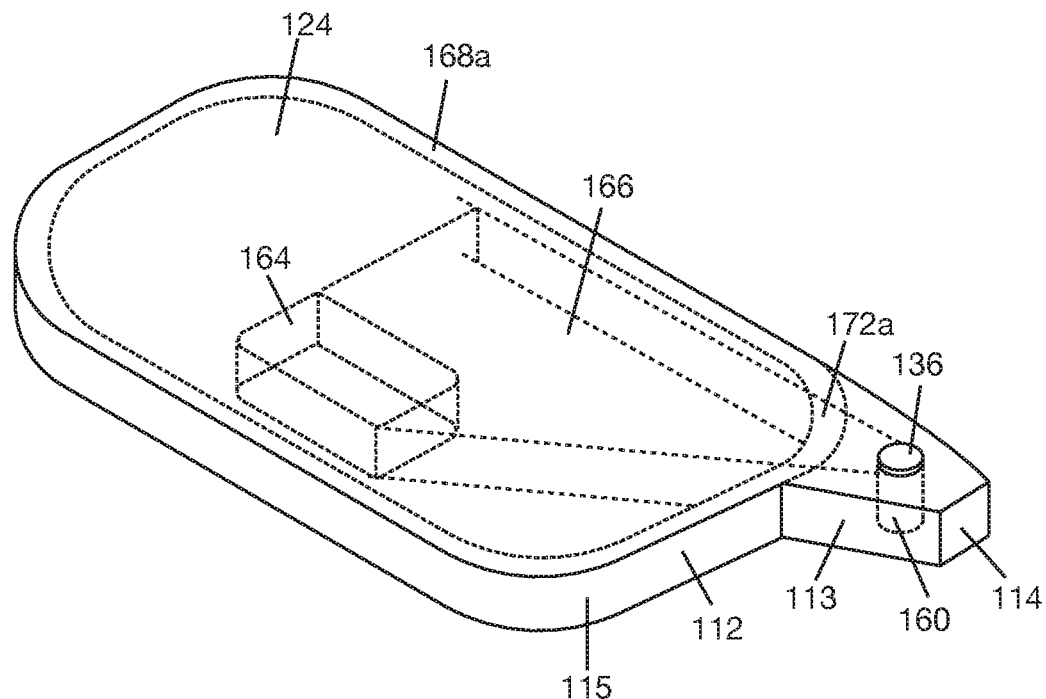
FIG. 3A is an isometric view illustrating an input zone, an output zone, a propagation zone, and a crossover zone of a lightguide.

Referring to FIG. 3A, lightguide 112 has an input zone 160 where light is received into lightguide 112, an output zone 164 where light exits lightguide 112, and a propagation zone 166 that extends between input zone 160 and output zone 164 and that provides a propagation path for light from input zone 160 to output zone 164. In FIG. 3A, input zone 160 is a portion of lightguide 112 that is aligned with or in registration with input coupler 136, and output zone 164 is a portion of lightguide 112 that is aligned with or in registration with output coupler 140. (For the example of FIG. 1D where light is coupled into lightguide 112 through input edge 114, input zone 160 will coincide with input edge 114. In this case, propagation zone 166 will extend between input edge 114 and output zone 164.) Lightguide 112 has a seal area 168a, which is a portion of top lightguide surface 124 that contacts sealant layer 156 (in FIGS. 1A-1E). In one implementation, input zone 160 is located in extension portion 113 of lightguide 112. In this case, if a hermetic seal is to be formed between lens 108 (in FIGS. 1A-1E) and lightguide 112 and around medium gap 144, seal area 168a will have to cross over propagation zone 166. Thus, lightguide 112 includes a crossover zone 172a where a portion of seal area 168a crosses over, or extends across, propagation zone 166. When sealant layer 156 is carried by seal area 168a, as shown in FIGS. 1A-1E, a portion 156a of sealant layer 156 will be stacked over crossover zone 172a.

Figure 3B:
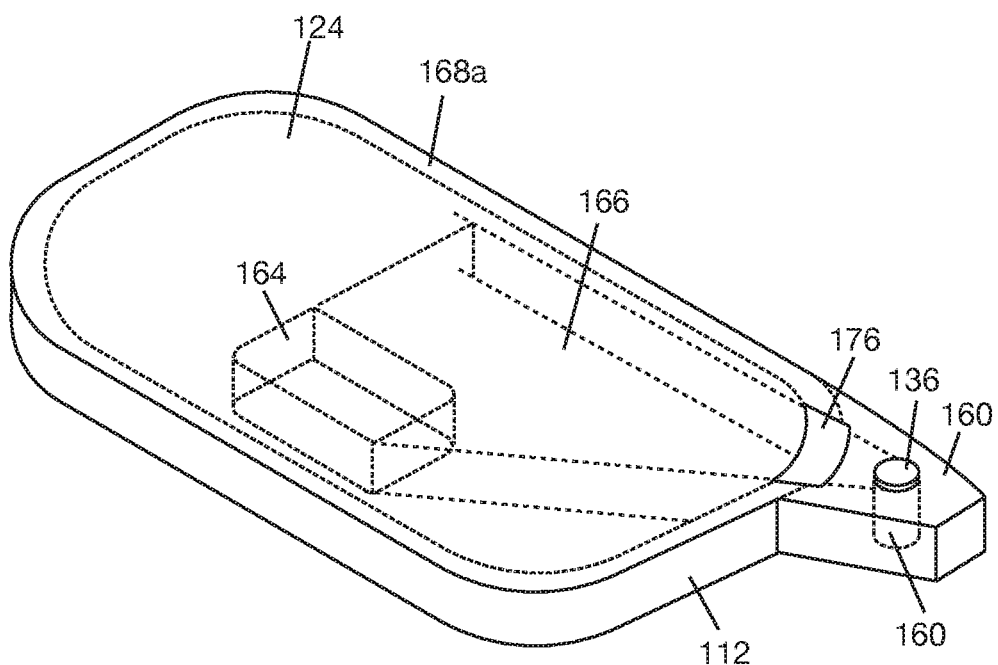
FIG. 3B is an isometric view showing a reflective optical coating on a crossover zone of a lightguide.

Referring to FIG. 3B, a reflective optical coating 176 is applied to a portion of top lightguide surface 124 corresponding to crossover zone 172a (in FIG. 3A), i.e., to a top surface of crossover zone 172a. Reflective optical coating 176 may extend slightly over parts of top lightguide surface 124 neighboring the top surface of crossover zone 172a to provide complete coverage over the top surface of crossover zone 172a. FIG. 3C shows sealant layer 156 on seal area 168a (in FIGS. 3A and 3B) of lightguide 112. Sealant layer 156 crosses over reflective optical coating 176 such that a portion 156a of sealant layer 156 is stacked over reflective optical coating 176. Since reflective optical coating 176 is stacked over crossover zone 172a (in FIG. 3A), sealant layer portion 156a is also stacked over crossover zone 172a, as shown in FIGS. 1A-1E.

FIGS. 1A-1E show that reflective optical coating 176 is interposed between the top surface of crossover zone 172a and the bottom surface of the sealant layer portion 156a. In one example, reflective optical coating 176 is in contact with the top surface of crossover zone 172a. Light propagating from input zone 160 to output zone 164 (or from input edge 114 to output zone 164 in the example of FIG. 1D), through propagation zone 166, will at some point pass through crossover zone 172a. Light striking the boundary between crossover zone 172a and reflective optical coating 176 as the light passes through crossover zone 172a will be reflected back into lightguide 112 by reflective optical coating 176. If the light strikes the boundary between crossover zone 172a and reflective optical coating 176 at an angle that is equal to or greater than an associated critical angle, the light reflected by reflective optical coating 176 will continue to propagate through propagation zone 166 by total internal reflection.

If reflective optical coating 176 is not present between sealant layer portion 156a and crossover zone 172a and sealant layer portion 156a contacts the top surface of crossover zone 172a instead, light passing through crossover zone 172a will strike a boundary formed between sealant layer portion 156a and crossover zone 172a. To guide the light through crossover zone 172a and further within propagation zone 166 by total internal reflection, the refractive index of sealant layer portion 156a would have to be selected to ensure that total internal reflection would not be broken. For example, the refractive index of sealant layer portion 156a would have to be lower than the refractive index of lightguide 112 and/or matched to the refractive index of the medium surrounding lightguide 112. If air is the medium surrounding lightguide 112, e.g., if the medium gap spaces 152 contain air, the refractive index of sealant layer 156 would need to be approximately 1.0. Finding a sealant layer 156 with a refractive index of about 1.0 may be an impossible task since solid materials typically have a refractive index greater than 1.0. Reflective optical coating 176 separates sealant layer portion 156a from crossover zone 172a so that sealant layer 156 does not have to play a role in guiding light through crossover zone 172.

Reflective optical coating 176 may be designed to reflect visible light or the wavelengths of light that would be transmitted through lightguide 112. Reflective optical coating 176 may be, for example, a metallic coating or a dielectric coating designed to reflect light in a desired wavelength range. To provide medium gap 144 with a hermetic seal, the sealant layer portion 156a overlapping reflective optical coating 176 would need to be capable of forming a seal with reflective optical coating 172. If an anti-reflective coating is applied to top lightguide surface 124, the portion of top lightguide surface 124 where reflective optical coating 176 is applied may be free of the anti-reflective coating such that a reflective boundary is formed at the interface between the reflective optical coating 176 and the crossover zone 172a.

Figure 4B:
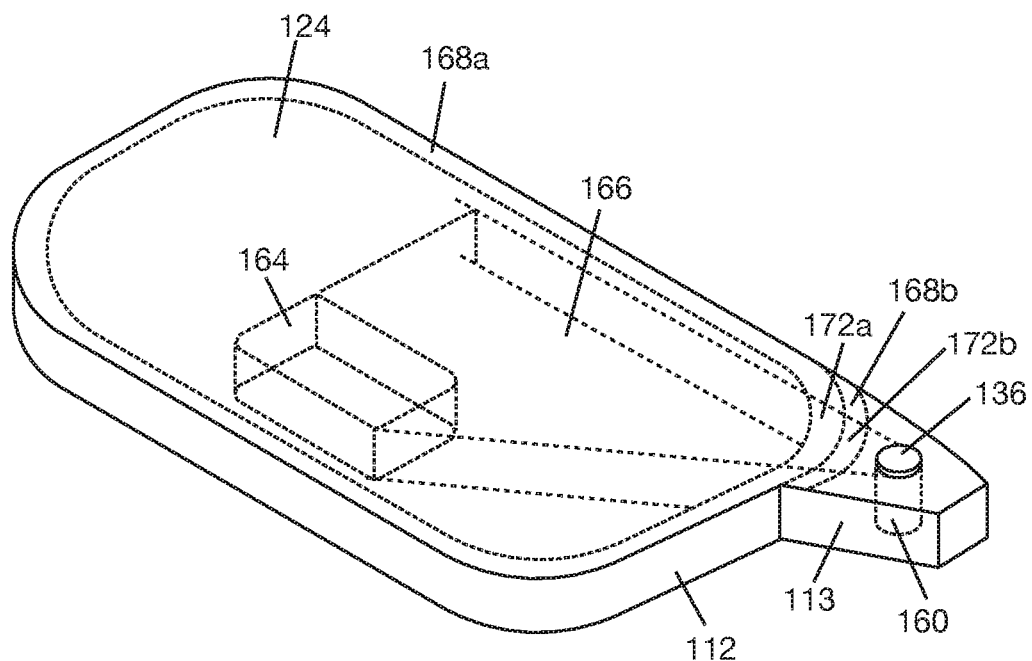
FIG. 4B is an isometric view showing an input zone, an output zone, a propagation zone, and a crossover zone of the lightguide of FIG. 4A.
Figure 4C:
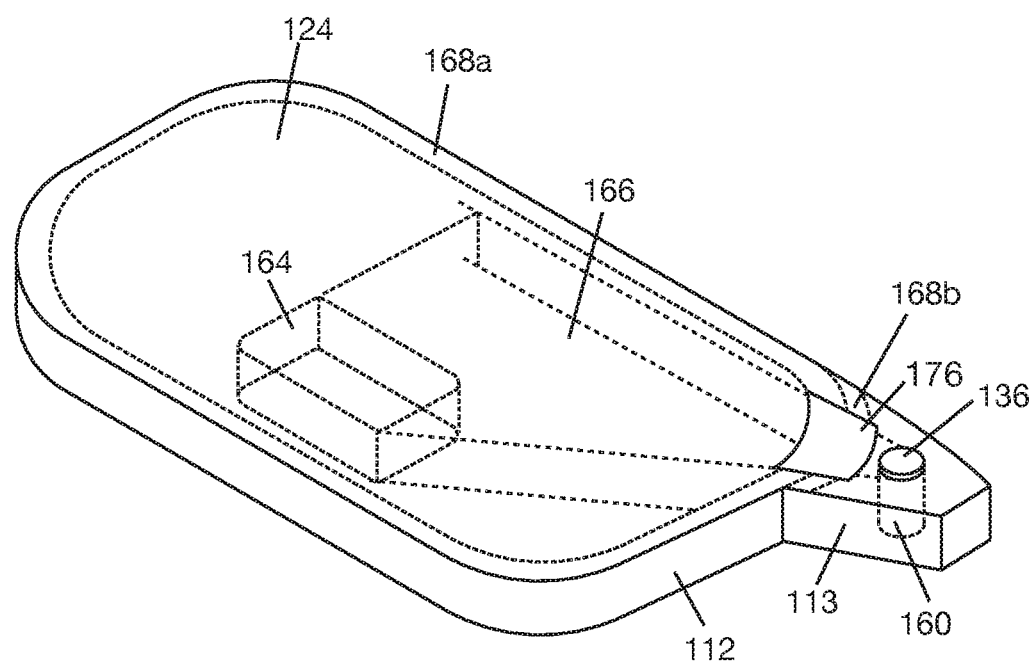
FIG. 4C is an isometric view showing a reflective optical coating on the crossover zone of the lightguide of FIGS. 4A and 4B.

There are other methods of holding lens 108 and lightguide 112 together or sealing around medium gap 144 that may result in different seal area configurations on lightguide 112. As an example, FIG. 4A shows a seal 157 including a sealant band 158 and sealant layer 156. Sealant band 158 forms a band around lens 108 and a portion of lightguide 112 in registration with lens 108 and engages lens 108 and lightguide 112. Sealant layer 156 is disposed between lens 108 and lightguide 112 as described above. In the example shown in FIG. 4A, sealant band 158 is integrally formed with, or otherwise attached to, sealant layer 156 to form seal 157. FIG. 4B shows the seal area configuration on lightguide 112 for the example of FIG. 4A. In FIG. 4B, lightguide 112 has first seal area 168a to make contact with sealant layer 156 (in FIG. 4A) and second seal area 168b to make contact with the portion of sealant band 158 (in FIG. 4A) crossing over lightguide 112. Lightguide 112 includes a first crossover zone 172a where a portion of first seal area 168a crosses over propagation zone 166 and a second crossover zone 172b where a portion of second seal area 168b crosses over propagation zone 166. FIG. 4C shows reflective optical coating 176, as described above, applied to a portion of top lightguide surface 124 corresponding to both crossover zones 172a, 172b (in FIG. 4B). Referring back to FIG. 4A, reflective optical coating 176 is interposed between a top surface of first cross zone 172a and sealant layer portion 156a that is stacked over first crossover zone 172a and between a top surface of second crossover zone 172b and sealant band portion 158a that is stacked over second crossover zone 172b.

Figure 5A:
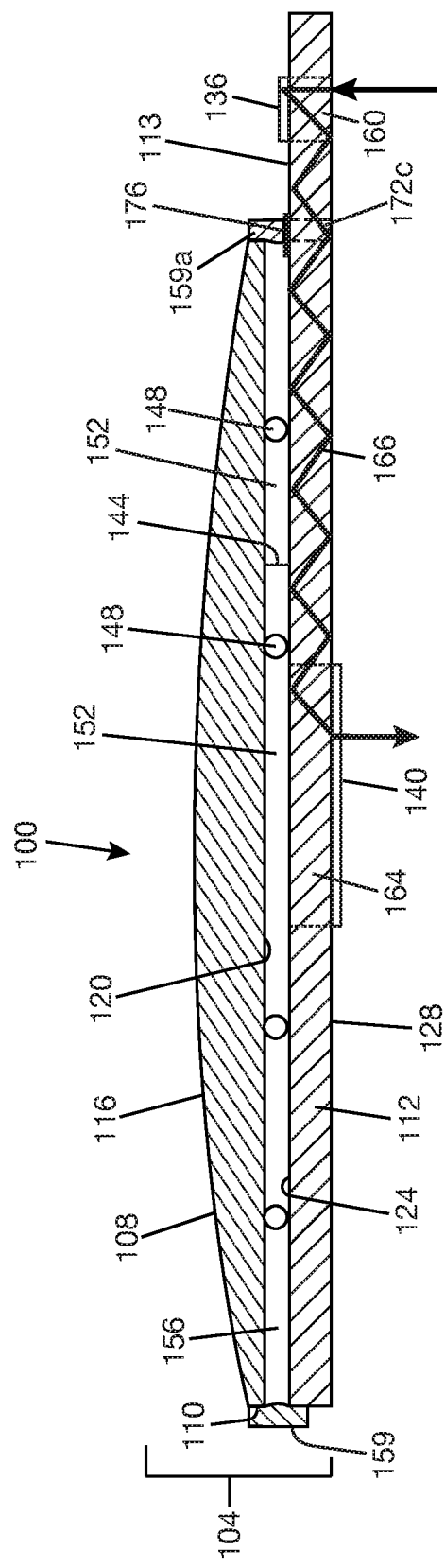
FIG. 5A is a cross-sectional view showing an optical combiner lens including a lens and a lightguide arranged in a stack, a seal forming a sealant band around the lens and the lightguide, and a reflective optical coating interposed between a portion of the seal and the lightguide.
Figure 5B:
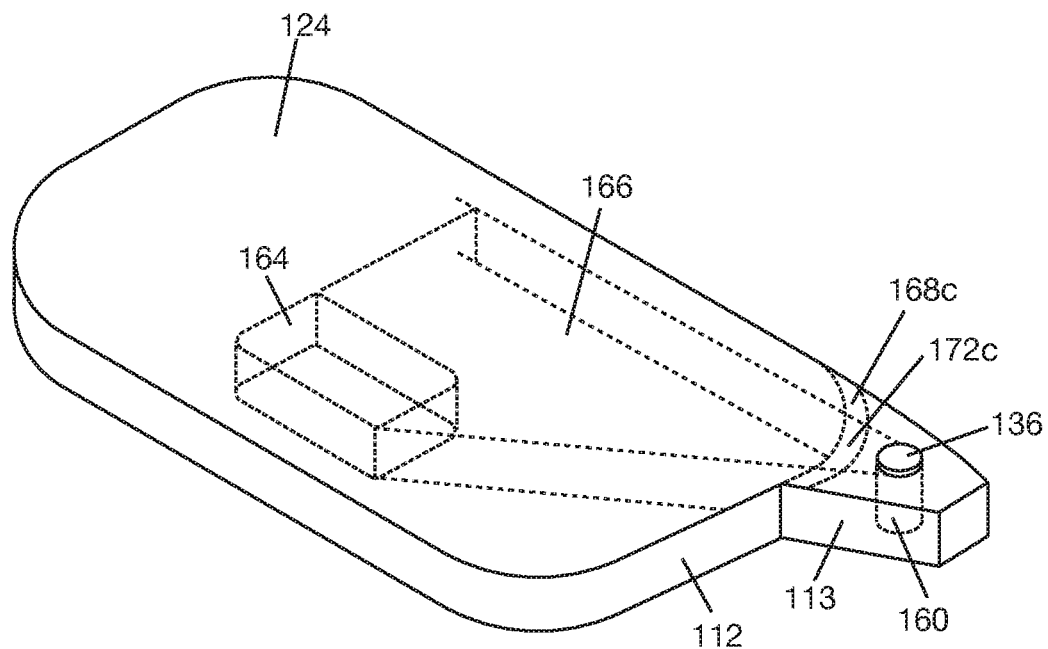
FIG. 5B is an isometric showing an input zone, an output zone, a propagation zone, and a crossover zone of the lightguide of FIG. 5A.
Figure 5C:
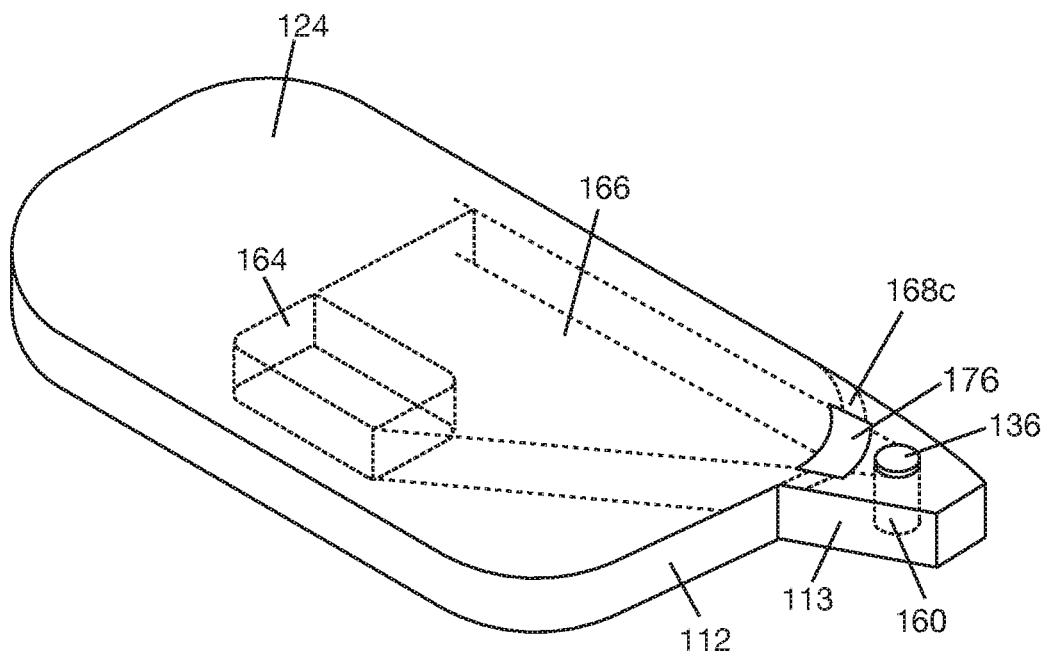
FIG. 5C is an isometric view showing a reflective optical coating on the crossover zone of the lightguide of FIGS. 5A and 5B.

FIG. 5A shows another example where a sealant band 159 is disposed at a periphery 110 of stack 104 but a sealant layer is not disposed between lens 108 and lightguide 112. In the example of FIG. 5A, sealant band 159 forms a band around lens 108 and around a portion of lightguide 112 in registration with lens 108 and engages lens 108 and lightguide 112. A portion 159a of sealant band 159 crosses over extension portion 113 of lightguide 112 to provide a seal around medium gap 144. FIG. 5B shows the seal area configuration on lightguide 112 for the example of FIG. 5A. In FIG. 5B, lightguide has a seal area 168c to make contact with the portion of sealant band 159 (in FIG. 5A) crossing over lightguide 112. Lightguide 112 includes a crossover zone 172c where a portion of seal area 168c crosses over propagation zone 166. FIG. 5C shows reflective optical coating 176, as described above, applied to a portion of top lightguide surface 124 corresponding to crossover zone 172c (in FIG. 5B). Referring back to FIG. 5A, reflective optical coating 176 is interposed between a top surface of crossover zone 172c and sealant band portion 159a that is stacked over crossover zone 172c.

Figure 6A:
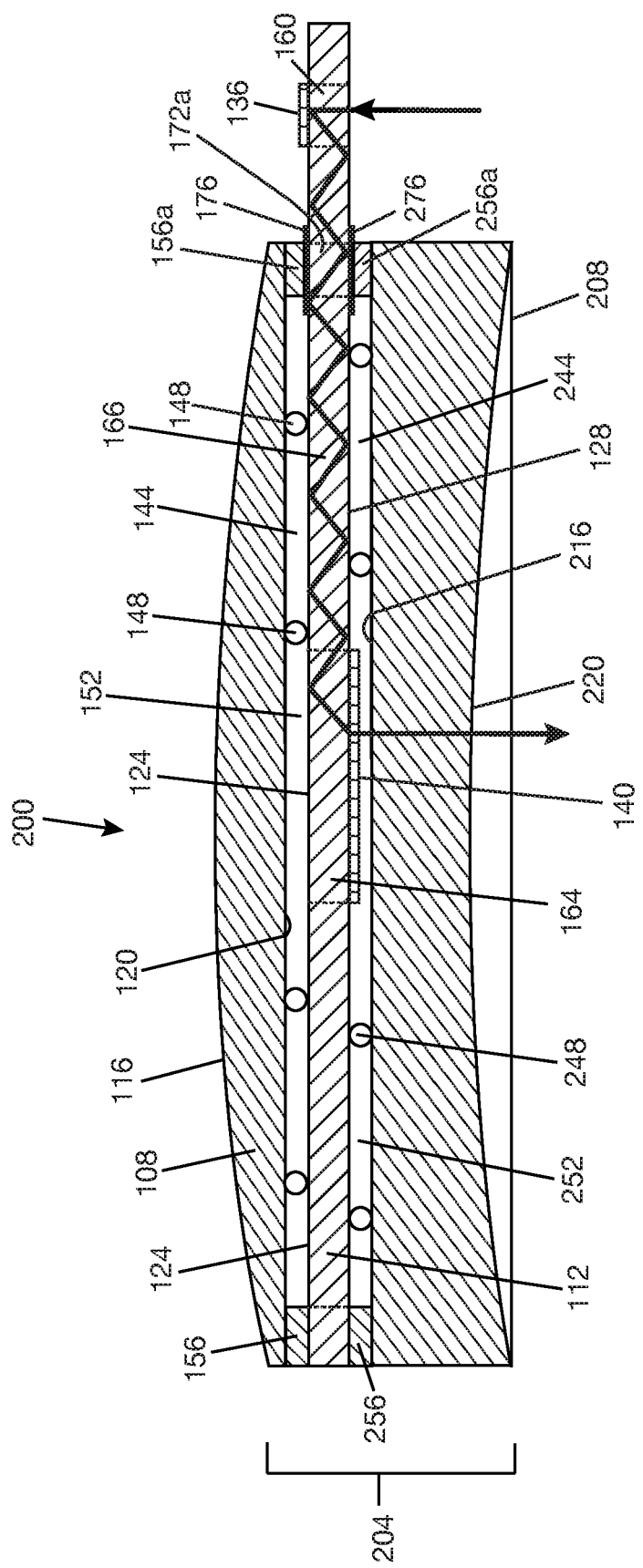
FIG. 6A is a cross-sectional view showing a double lens optical combiner lens including first and second lenses and a lightguide arranged in a stack, spacers disposed between the lenses and the lightguide, seals forming sealant layers between the lenses and the lightguide, and reflective optical coatings interposed between the portions of the seals and the lightguide.

FIG. 6A shows a double lens optical combiner lens 200 including lens 108 (first lens), lightguide 112, and a second lens 208 arranged to form a stack 204, with lightguide 112 disposed between first lens 108 and second lens 208. First lens 108 and lightguide 112 may have any combination of the characteristics already described above with reference to FIGS. 1A-5C. First lens 108 is shown as a planoconvex lens. In other examples, first lens 108 may be a meniscus lens where the inner lens surface 120 is concave and outer lens surface 116 of first lens 108 is convex (see FIG. 1B). Second lens 208 has an inner lens surface 216 and outer lens surface 220. In one example, inner lens surface 216 is planar, and outer lens surface 220 is concave, i.e., second lens 208 is a planoconcave lens. In other examples, second lens 208 may be a biconcave lens, where the inner lens surface 216 and the outer lens 220 are both concave. Outer lens surface 116 of first lens 108 may be the world side of optical combiner lens 200, and outer lens surface 220 of second lens 208 may be the eye side of optical combiner lens. Curvatures of lens surfaces 116, 220 may be selected to achieve a desired eyeglasses prescription. Input coupler 136 is arranged to couple light into input zone 160 of lightguide 112, and output coupler 140 is arranged to couple light into output zone 164 of lightguide 112, as previously described. (It is also possible to omit input coupler 136 and couple light into lightguide 112 via an input edge 114 of lightguide 112 as previously described with reference to FIG. 1D. Input edge 114 may be regarded as the input zone of the lightguide when edge coupling of light into lightguide 112 is used.) Light coupled into input zone 160 will propagate to output zone 164 through propagation zone 166, as previously described. In combiner lens 200, light outputted by output coupler 140 will pass through second lens 208 to the target. Input coupler 136 and output coupler 140 may have any combination of the characteristics already described above with reference to FIGS. 1A-1C and 1E.

Inner lens surface 120 of first lens 108 is in opposing relation to top lightguide surface 124 and spaced apart from top lightguide surface 124 by medium gap 144, as previously described. Spacers 148 may be arranged in medium gap 144 to set the height of medium gap 144, as previously described. In some examples, the set height of medium gap 144 may be in a range from 2 microns to 100 microns. Medium gap 144 may have spaces 152 around and in between spacers 148 that contain a medium, such as air or other gaseous material, a liquid material, or a solid material. Similarly, inner lens surface 216 of second lens 208 is in opposing relation to bottom lightguide surface 128 and spaced apart from bottom lightguide surface 128 by a medium gap 244 having a set height. Spacers 248 may be arranged in medium gap 244 to set the height of medium gap 244. In some examples, the set height of medium gap 244 may be in a range from 2 microns to 100 microns. The set height of medium gap 244 may be the same or may be different from the set height of medium gap 144. Medium gap 244 may have spaces 252 around and in between spacers 248 that contain a medium, such as air or other gaseous material, a liquid material, or a solid material.

Sealant layer 156 may be disposed between inner lens surface 120 of first lens 108 and top lightguide surface 124 of lightguide 112, as previously described. In one example, sealant layer 156 forms a closed loop that circumscribes medium gap 144 and may provide a hermetic seal to medium gap 144 at a periphery of stack 204 in the same manner described for the examples of FIGS. 1A-1E. Similarly, a sealant layer 256 may be disposed between inner lens surface 216 of second lens 108 and bottom lightguide surface 128 of lightguide 112. In one example, sealant layer 256 may form a closed loop that circumscribes medium gap 244 and may provide a hermetic seal to medium gap 244 at the periphery of stack 204 in the same manner described for sealant layer 156 and medium gap 144 above.

Reflective optical coating 176 is provided between crossover zone 172a of lightguide 112 and sealant layer portion 156a that is stacked over crossover zone 172a, as previously described. A reflective optical coating 276, which may be similar in properties to reflective optical coating 176, is provided between crossover zone 172a and sealant layer portion 256a that is stacked below crossover zone 172a. Reflective optical coating 176 is applied to the top surface of crossover zone 172a and is interposed between the top surface of crossover zone 172 and the sealant layer portion 156a. Similarly, reflective optical coating 276 is applied to the bottom surface of crossover zone 172 and is interposed between the bottom surface of crossover zone 172a and the sealant layer portion 256a. Light striking the top boundary between the top surface of crossover zone 172a and reflective optical coating 176 will be reflected back into lightguide 112 by reflective optical coating 176. Similarly, light striking the bottom boundary between the bottom surface of crossover zone 172a and reflective optical coating 276 will be reflected back into lightguide 112 by reflective optical coating 276. If the light strikes either of the top and bottom boundaries at an angle that is equal to or greater than an associated critical angle, the reflected light will continue to propagate through crossover zone 172a and propagation zone 166 by total internal reflection.

Figure 6B:
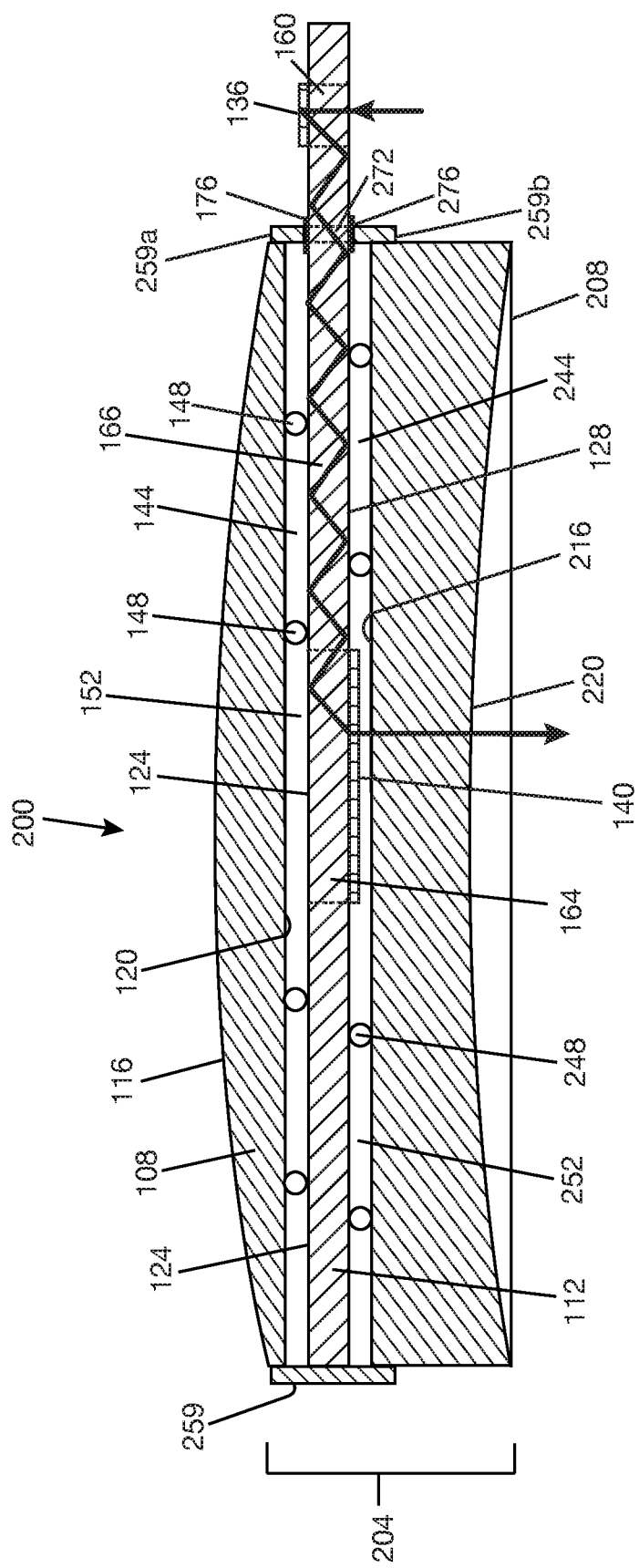
FIG. 6B is a cross-sectional view showing a double lens optical combiner lens including first and second lenses and a lightguide arranged in a stack, spacers disposed between the lenses and the lightguide, a seal forming a sealant band around the lenses and the lightguide, and reflective optical coatings interposed between a portion of the seal and the lightguide.

Various modifications are possible to the optical combiner lens 200. For example, the first lens 108 could be a meniscus lens (see FIGS. 1B and 1E). Also, the inner second lens 208 may be biconcave lens. This would give additional surfaces whose curvatures can be adjusted to achieve a desired eyeglasses prescription or other combiner lens function. FIG. 6A shows microbead spacers 148, 248 in medium gaps 144, 244, respectively. However, other types of spacers, such as hemispherical spacers or micropillar spacers, may be used instead (see micropillar spacers 248 in FIG. 1E). Further, a sealant band may be used to hold first lens 108, lightguide 112, and second lens 208 together and/or to seal around medium gaps 144, 244. For example, FIG. 6B shows a sealant band 259 holding first lens 108, lightguide 112, and second lens 208 together and sealing around medium gaps 144, 244. In this case, lightguide 112 has crossover zone 272 that is stacked relative to portions 259a, 259b of sealant band 256. Reflective optical coatings 176, 276 are interposed between sealant band portions 259a, 259b and crossover zone 272. In another example, a combination of the sealing methods shown in FIGS. 6A and 6B may be used. It should also be noted that sealant band 259 may be replaced with two sealant bands, one to seal around medium gap 144 and the other to seal around medium gap 244. In general, reflective optical coatings 176, 276 should be provided wherever light needs to be guided past a seal as the light moves through the propagation zone 166. In describing the optical combiner lens 200, reference numbers from FIGS. 1A-5C have been reused. In general, features with the same reference numbers across FIGS. 1A-6B are deemed to have the same characteristics, unless stated otherwise.

Figure 7A:
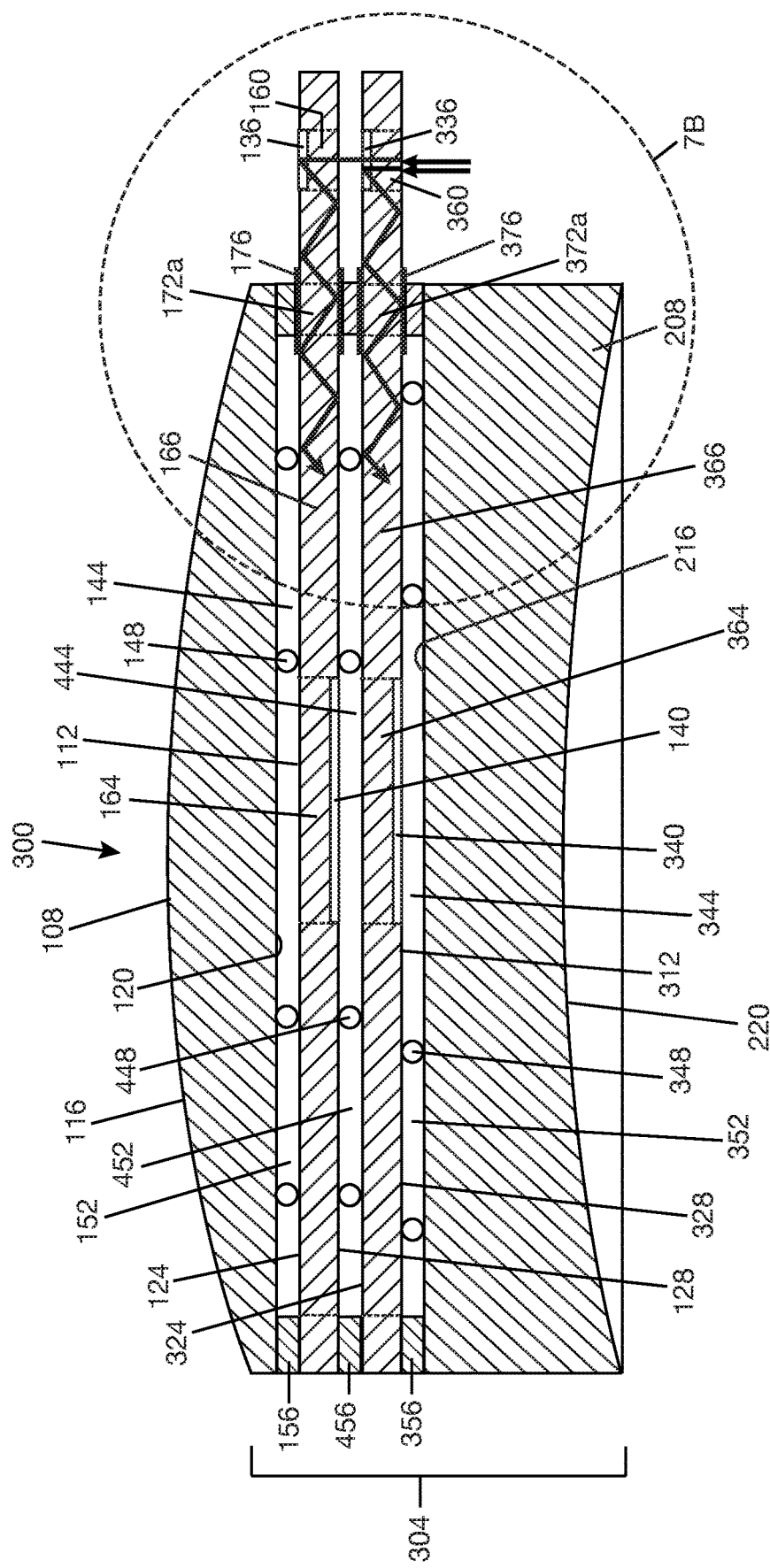
FIG. 7A is a cross-sectional view showing a double lens optical combiner including two lenses and two lightguides arranged in a stack, spacers disposed between each lens and adjacent lightguide and between the two lightguides, seals forming sealant layers between each lens and adjacent lightguide and between the two lightguides, and reflective optical coatings interposed between the sealant layers and the lightguides.

FIG. 7A shows a double lens optical combiner lens 300 including first lens 108, first lightguide 112, second lightguide 312, and second lens 208 arranged to form a stack 304. Optical combiner lens 300 includes a stack of two lightguides 112, 312 between first lens 108 and second lens 208. However, this is not intended to be a limit on the number of lightguides that could be included in the optical combiner lens. For example, the optical combiner lens could include a stack of three lightguides between first lens 108 and second lens 208, where each of the lightguides may be dedicated to guiding one of red light, green light, and blue light. For the example with two lightguides 112, 312, one lightguide may be used to guide two wavelength ranges, e.g., red light and green light, and the other lightguide may be used to guide another wavelength range, e.g., blue light. However, this is again not intended to be a limitation on what wavelengths could be guided by each of the lightguides.

In FIG. 7A, inner lens surface 120 of first lens 108 is in opposing relation to top lightguide surface 124 of lightguide 112, bottom lightguide surface 128 of lightguide 112 is in opposing relation to top lightguide surface 324 of lightguide 312, and bottom lightguide surface 328 of lightguide 312 is in opposing relation to inner lens surface 216 of second lens 208. Medium gap 144 is formed between top lightguide surface 124 of lightguide 112 and inner lens surface 120 of first lens 108, as previously described. Spacers 148 may be arranged in medium gap 144 to set a height of medium gap 144. The height of medium gap 148 may be or may not be uniform across stack 304. Spaces 152 around and in between spacers 148 may contain a medium, as previously described. Medium gap 344 is formed between bottom lightguide surface 328 and inner lens surface 216. Spacers 348 may be arranged in medium gap 344 to set the height of medium gap 344. The height of medium gap 344 may be or may not be uniform. There are spaces 352 around and in between spacers 348. Spaces 352 contain a medium, such as air or other gaseous material, liquid material, or a solid material. Medium gap 444 is formed between bottom lightguide surface 128 of lightguide 112 and top lightguide surface 324 of lightguide 312. Spacers 448 may be arranged in medium gap 444 to set the height of medium gap 444. The height of medium gap 444 may be or may not be uniform. There are spaces 452 around and in between spacers 448. Spaces 452 may contain a medium as described above for spaces 152, 352. In some examples, the height of each medium gap 144, 344, 444 may be in a range from 2 microns to 100 microns.

Lightguide 112 has an input zone 160, output zone 164, propagation zone 166, and crossover zone 172a, as previously described. Input coupler 136 is positioned to couple light into input zone 160, and output coupler 140 is positioned to couple light out of output zone 164, as previously described. In one implementation, lightguide 312 has the same structure as lightguide 112, which means that lightguide 312 has an input zone 360 (similar to 160 in FIG. 3A), output zone 364 (similar to 164 in FIG. 3A), propagation zone 366 (similar to 166 in FIG. 3A), and crossover zone 372a (similar to 172a in FIG. 3A), as described for lightguide 112. An input coupler 336 may be positioned and designed to couple light into input zone 360, and an output coupler 340 may be positioned and designed to couple light out of output zone 364. Input coupler 336 may have the same characteristics as described above for input coupler 136, and output coupler 340 may have the same characteristics as described above for output coupler 140.

Sealant layer 156 is disposed between inner lens surface 120 of first lens 108 and top lightguide surface 124 of lightguide 112, as previously described. In one example, sealant layer 156 may form a closed loop that circumscribes medium gap 144 and may provide a hermetic seal to medium gap 144 at a periphery of stack 304 in the same manner described for the example of FIG. 1A. Similarly, a sealant layer 356 is disposed between inner lens surface 216 of second lens 108 and bottom lightguide surface 328 of lightguide 312. In one example, sealant layer 356 may form a closed loop that circumscribes medium gap 344 and may provide a hermetic seal to medium gap 344 at the periphery of stack 304 in the same manner described for sealant layer 156 and medium gap 144 above. Similarly, a sealant layer 456 is disposed between bottom lightguide surface 128 of lightguide 112 and top lightguide surface 324 of lightguide 312. In one example, sealant layer 456 may form a closed loop that circumscribes medium gap 444 and may provide a hermetic seal to medium gap 444 at the periphery of stack 304 in the same manner described for sealant layer 156 and medium gap 144 above.

Figure 7B:
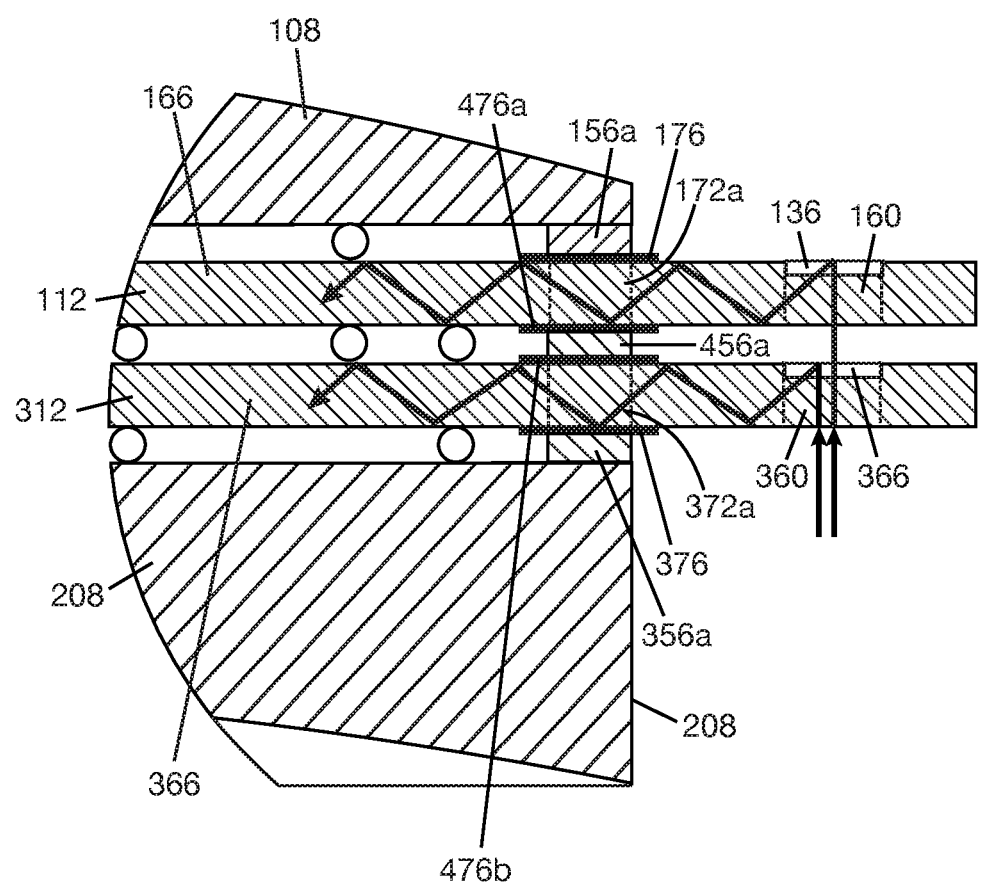
FIG. 7B is an enlargement of a portion 7B of FIG. 7A.

Referring to FIG. 7B, there are three sealant layer portions 156a, 356a, 456a and two crossover zones 172a, 372a arranged in a stack in optical combiner lens 300. To guide light through crossover zone 172a, reflective optical coating 176 is provided between sealant layer portion 156a and a top surface of crossover zone 172a, and reflective optical coating 476a is provided between sealant layer portion 456a and a bottom surface of crossover zone 172a. The reflective optical coating 476a may be similar in properties to reflective optical coating 176, as previously described. Light striking the top boundary between the top surface of crossover zone 172a and reflective optical coating 176 will be reflected back into lightguide 112 by reflective optical coating 176, and light striking the bottom boundary between the bottom surface of crossover zone 172a and reflective optical coating 476a will be reflected back into lightguide 112 by reflective optical coating 476a. If the light strikes either of the top and bottom boundaries at an angle that is equal to or greater than an associated critical angle, the reflected light will continue to propagate through crossover zone 172a and propagation zone 166 by total internal reflection.

To guide light through crossover zone 372a, a reflective optical coating 376 is provided between sealant layer portion 356a and a bottom surface of crossover zone 372a, and a reflective optical coating 476b is provided between sealant layer portion 456a and top surface of crossover zone 372a. The reflective optical coatings 376, 476b may be similar in properties to reflective optical coating 176, as previously described. Light striking the top boundary between the top surface of crossover zone 372a and reflective optical coating 476b will be reflected back into lightguide 312 by reflective optical coating 476b. Similarly, light striking the bottom boundary between the bottom surface of crossover zone 372a and reflective optical coating 376 will be reflected back into lightguide 312 by reflective optical coating 376. If the light strikes either of the top and bottom boundaries at an angle that is equal to or greater than an associated critical angle, the reflected light will continue to propagate through crossover zone 372a and propagation zone 366 by total internal reflection.

Various other modifications to optical combiner lens 300 are possible. In one example, one or both of input couplers 136, 366 could be prisms instead of optical gratings. In another example, one or both of input couplers 136, 366 may be omitted and edge coupling may be used to couple light into the respective lightguide 112, 312. In another example, a sealant band may be used to hold first lens 108, first lightguide 112, second lightguide 312, and second lens 208 together as well as seal around medium gaps 144, 344, 444 (in the same manner as shown for sealant band 259 in FIG. 6B).

The above description of illustrated embodiments, including what is described in the Abstract of the disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The invention claimed is:

1. An optical combiner lens, comprising:
a lightguide having an input zone at which light enters the lightguide, an output zone from which light exits the lightguide, and a propagation zone between the input zone and the output zone that provides a propagation path for light from the input zone to the output zone;
a lens stacked over the lightguide;
a seal engaging the lightguide and the lens, the seal positioned relative to the lightguide such that a portion of the seal is stacked over a portion of the propagation zone; and
a reflective optical coating interposed between the portion of the seal and the portion of the propagation zone.

2. The optical combiner lens of claim 1, further comprising an input coupler positioned to couple light into the input zone and an output coupler positioned to couple light out of the output zone.

3. The optical combiner lens of claim 1, wherein the input zone is provided by a portion of an edge surface of the lightguide, and further comprising an output coupler positioned to couple light out of the output zone.

4. The optical combiner lens of claim 1, wherein the input zone is formed in an extension portion of the lightguide that is not in registration with the lens.

5. The optical combiner lens of claim 1, wherein the seal forms a sealant layer between the lens and a portion of the lightguide that is in registration with the lens, and wherein the sealant layer forms a closed loop.

6. The optical combiner lens of claim 1, wherein the seal forms a sealant band around the lens and a portion of the lightguide that is in registration with the lens.

7. The optical combiner lens of claim 1, wherein the seal includes a first seal section that forms a sealant layer between the lens and a portion of the lightguide that is in registration with the lens and a second seal section that forms a sealant band around the lens and the portion of the lightguide that is in registration with the lens.

8. The optical combiner lens of claim 1, wherein the lens and the lightguide have opposed surfaces that are spaced apart by a medium gap having a set height, and wherein the seal circumscribes the medium gap.

9. The optical combiner lens of claim 8, further comprising a plurality of spacers disposed in the medium gap to maintain the set height, and wherein the medium gap contains a medium in spaces between and around the spacers, the medium having a refractive index that is lower than a refractive index of the lightguide.

10. The optical combiner lens of claim 1, wherein the reflective optical coating is a metallic coating or a dielectric coating.

11. An optical combiner lens, comprising:
a lightguide having an input zone at which light enters the lightguide, an output zone from which light exits the lightguide, and a propagation zone between the input zone and the output zone that provides a propagation path for light from the input zone to the output zone;
a first lens stacked over a top surface of the lightguide;
a first seal engaging the first lens and the lightguide, wherein a portion of the first seal is positioned to overlie the propagation zone;
a first reflective optical coating interposed between the portion of the first seal and the propagation zone;
a second lens stacked under a bottom surface of the lightguide;
a second seal engaging the second lens and the lightguide, wherein a portion of the second seal is positioned to underlie the propagation zone; and
a second reflective optical coating interposed between the portion of the second seal and the propagation zone.

12. The optical combiner lens of claim 11, further comprising an output coupler positioned to couple light out of the output zone and an output coupler positioned to couple light into the input zone.

13. The optical combiner lens of claim 11, wherein the input zone is located in an extension portion of the lightguide that is not in registration with either of the first lens and the second lens.

14. The optical combiner lens of claim 13, wherein the first seal forms a closed loop that is disposed between the first lens and a portion of the lightguide in registration with the first lens, and wherein the second seal forms a closed loop that is disposed between the second lens and a portion of the lightguide in registration with the second lens.

15. The optical combiner lens of claim 13, wherein the first seal forms a first sealant band around the first lens and a portion of the lightguide that is in registration with the first lens, and wherein the second seal forms a second sealant band around the second lens and a portion of the lightguide that is in registration with the second lens.

16. The optical combiner lens of claim 11, wherein the first lens has a first inner lens surface in opposing relation to the top surface of the lightguide, the first inner lens surface spaced apart from the top surface of the lightguide by a first medium gap having a first set height, and wherein the second lens has a second inner lens surface in opposing relation to the bottom surface of the lightguide, the second inner lens surface spaced apart from the bottom surface of the lightguide by a second medium gap having a second set height.

17. The optical combiner lens of claim 11, wherein the lightguide is a planar lightguide, wherein the first lens is selected from a planoconvex lens and a meniscus lens, and wherein the second lens is selected from a planoconcave lens and a biconcave lens.

18. The optical combiner lens of claim 11, wherein the first and second reflective optical coatings are metallic coatings or dielectric coatings.

19. An optical combiner lens, comprising:
- a stack of lightguides, each of the lightguide in the stack of lightguides having an input zone at which light enters the lightguide, an output zone from which light exits the lightguide, and a propagation zone between the input zone and the output zone that provides a propagation path for light from the input zone to the output zone;
- a first lens stacked over a first lightguide at a top of the stack of lightguides;
- a first seal engaging the first lens and the first lightguide, wherein a portion of the first seal is positioned to overlie the propagation zone of the first lightguide;
- a first reflective optical coating interposed between the portion of the first seal and the propagation zone of the first lightguide;
- a second lens stacked under a second lightguide at a bottom of the stack of lightguides;
- a second seal engaging the second lens and the second lightguide, wherein a portion of the second seal is positioned to underlie the propagation zone of the second lightguide; and
- a second reflective optical coating interposed between the portion of the second seal and the propagation zone of the second lightguide.

20. The optical combiner lens of claim 19, further comprising an output coupler for each of the lightguides in the stack and an input coupler for each of the lightguides in the stack, each output coupler positioned to couple light out of the output zone of the respective lightguide, and each input coupler positioned to couple light into the output zone of the respective lightguide.

\* \* \* \* \*